United States Patent [19]
Tani et al.

[11] 3,854,092

[45] Dec. 10, 1974

[54] APPARATUS FOR MEASURING DYNAMIC CHARACTERISTICS OF SEMICONDUCTOR SWITCHING ELEMENTS

[75] Inventors: Tatsuo Tani; Michinobu Tomita, both of Tokyo, Japan

[73] Assignees: Kogyo Gijutsuin, an extra-Ministrerial bureau of Japanese Government; Iwasaki Tsushinki Kabushiki Kaisha

[22] Filed: Dec. 22, 1971

[21] Appl. No.: 210,743

[30] Foreign Application Priority Data
Dec. 27, 1970  Japan.............................. 45-119227

[52] U.S. Cl........................ 324/158 SC, 324/158 T
[51] Int. Cl............................................. G01r 31/22
[58] Field of Search ...... 324/158 SC, 158 T, 158 R, 324/73 R

[56] References Cited
UNITED STATES PATENTS
3,068,411  12/1962  Galman............................. 324/142
3,423,677  1/1969  Alford et al................... 324/158 R OTHER PUBLICATIONS
G. E. Controlled Rectifier Manual, 1st Ed., Mar. 1960, pp. 198–203.

Primary Examiner—Alfred E. Smith
Assistant Examiner—Ernest F. Karlsen
Attorney, Agent, or Firm—Robert E. Burns; Emmanuel J. Lobato; Bruce L. Adams

[57]  ABSTRACT

An apparatus for automatically measuring dynamic characteristics of a semiconductor switching element excited by a single pulse or repeated pulses. A current output and a voltage output derived from the excited element are respectively sampled simultaneously. Sampled values are successively stored and then successively read out for each of the current output and the voltage output. A desired calculation is performed for each combination of the sampled values of the current output and the voltage output; which are simultaneously read out, until read out of an immediately succeeding one of the combinations of the sampled values. Results of the above calculation are successively displayed in a display device.

6 Claims, 4 Drawing Figures

APPARATUS FOR MEASURING DYNAMIC CHARACTERISTICS OF SEMICONDUCTOR SWITCHING ELEMENTS

This invention relates to apparatus for measuring dynamic characteristics of semiconductor switching elements.

In the conventional art, measurement of the type is performed only for reserch activities, in which a voltage wave form and a current wave form derived from a sample to be measured are observed on the screen of a cathode-ray oscilloscope and then a photograph is taken of them. Thereafter, respective values of the developed copies of the voltage and current wave forms are manually measured by a scale at desired intervals under the same time relationship, so that required results are obtained by calculation for respective measurement points and then drawn into figures. Accordingly, a long time is necessary for obtaining dynamic characteristics of a sample, and processes are very troublesome.

However, measurement of dynamic characteristics (e.g.; an impedance characteristic, a power characteristic, or an average power) of an energized sample is important at manufacturing processes of high power thyristors for checking inferior products.

An object of this invention is to provide an apparatus for automatically measuring and displaying dynamic characteristics of semiconductor switching elements.

The principle, construction and operation of this invention will be understood from the following detailed discussion taken in conjunction with the accompanying drawings, in which.

Figure 1:
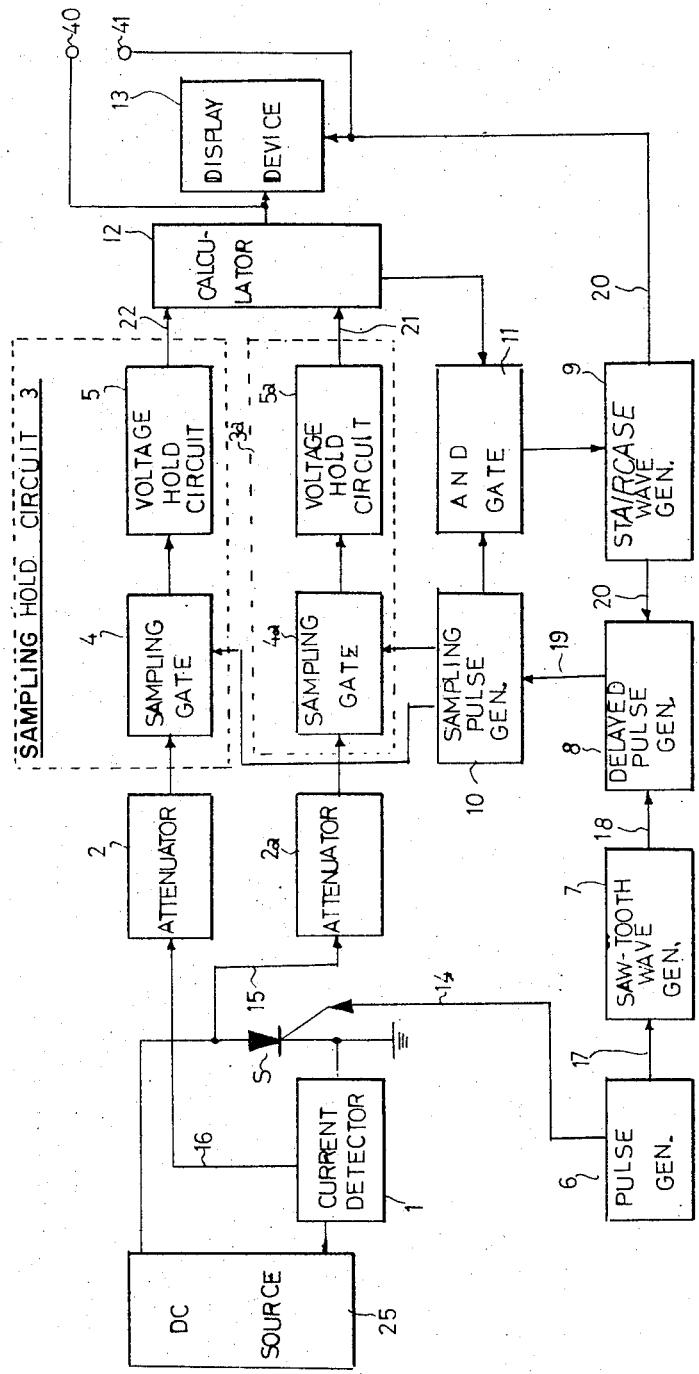
FIG. 1 is a block diagram illustrating an embodiment of this invention.

In an embodiment of this invention shown in FIG. 1, a sample S of a semiconductor switching element (e.g. a thyristor) is connected to a DC source 25 through current detecting means including current detector 1. In this case, a positive voltage is applied to the anode of the sample, while the cathode of the sample is grounded. The output of the current detector 1 is applied to sampling means including a sampling gate 4 through an attenuator 2, while a voltage of the anode of the sample S is applied to a sampling gate 4a through an attenuator 2a. The sampling gates 4 and 4a sample respective outputs of the attenuators 2 and 2a by the use of sampling pulse trains applied from a sampling pulse generator 10. A voltage hold circuit 5 holds a dc level of each sampled value of the sampling gate 4 until an immediately succeeding sampled output thereof, while a voltage hold circuit 5a holds a dc level of each sampled value of the sampling gate 4a until an immediately succeeding sampled output thereof. The sampling gate 4 and the voltage hold circuit 5 form a sampling hold circuit 3, while the sampling gate 4a and the voltage hold circuit 5a form a sampling hold circuit 3a. Calculating means including a calculator 12 receives respective outputs of the sampling hold circuits 3 and 3a and performs necessary calculation, such as multiplication and/or division etc. A calculated result of the calculator 12 is applied to display means including a display device 13, such as a cathode-ray oscilloscope or an X–Y recorder. A control pulse is applied from the calculator 12 to an AND gate 11 in response to each completion of necessary calculation operations.

On the other hand, pulse generator means including a pulse generator 6 generates pulse trains 14 and 17 at the same regular intervals. The pulse train 14 is applied to the gate of the sample S, while the pulse train 17 is applied to a saw-tooth wave generator 7. The saw-tooth wave generator 7 generates a saw-tooth wave 18 in synchronism with the pulse train 17. The saw-tooth wave 18 generated from the saw-tooth wave generator 7 is applied to one of two inputs of a delayed pulse generator 8. A staircase wave generator 9 generates a staircase wave 20 in synchronism with pulses from the AND gate 11, to which the output of the sampling pulse generator 10 and the control pulse from the calculator 12 are applied.

Figure 2:
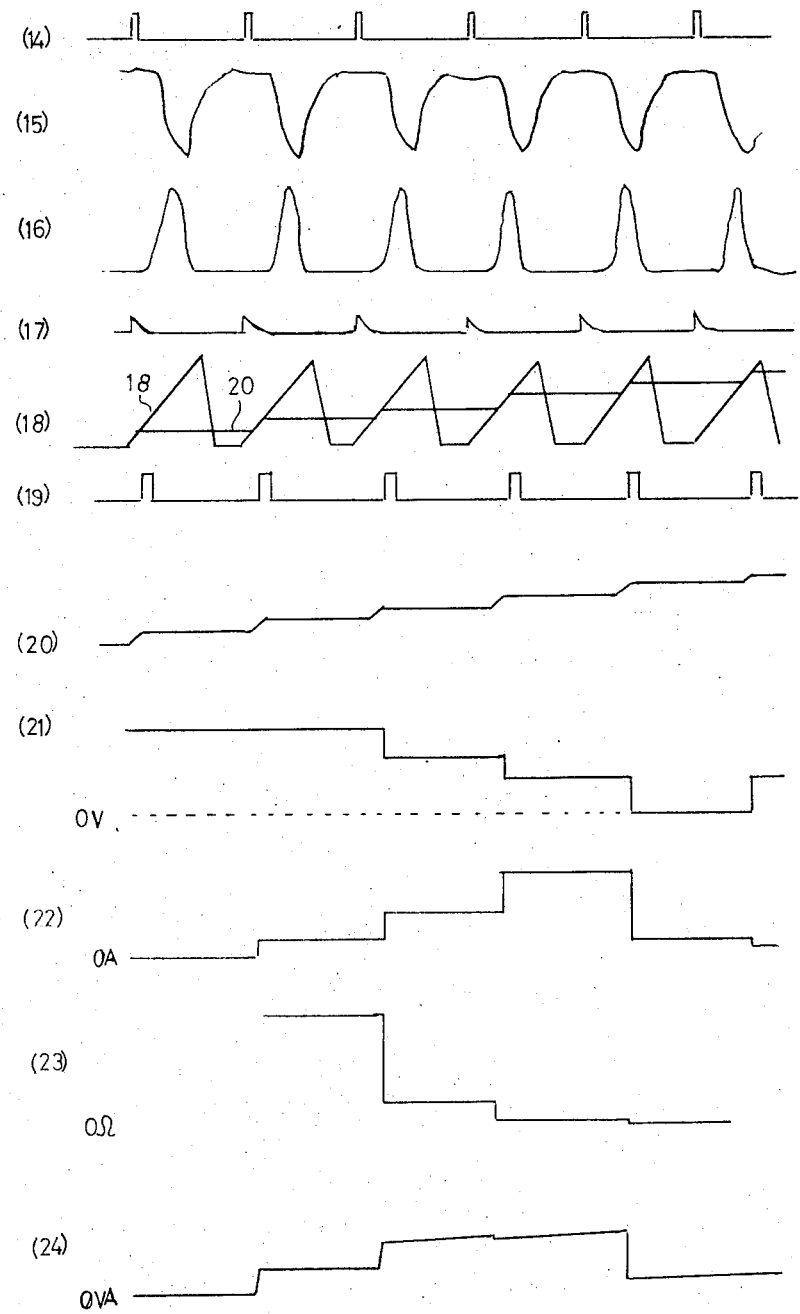
FIG. 2 shows time charts explanatory of operations of the embodiment shown in FIG. 1.

Operations of this embodiment will be described with reference to time charts shown in FIG. 2. If pulses of the pulse train 14 are applied to the gate of the sample S in the case of the application of a dc voltage from the dc source 25 to the anode and cathode of the sample S, the sample S becomes operative. A transitional current wave 16 is detected by the current detector 1 and applied to the sampling gate 4 through the attenuator 2. A transitional voltage wave 15 is derived from the anode of the sample S and applied to the sampling gate 4a through the attenuator 2a. The levels of the waves 14 and 15 are appropriately adjusted at the attenuators 2 and 2a respectively. On the other hand, the saw-tooth wave generator 7 generates a saw-tooth wave 18 in synchronism with pulses of the pulse train 17 applied from the pulse generator 6. The delayed pulse generator 8 generates pulses of a delayed pulse train 19 at respective coincident times between the saw-tooth wave 18 and a staircase wave 20 applied from the staircase wave generator 9. The sampling pulse generator 10 generates sampling pulses, which are synchronized with pulses of the delayed pulse train 19. Sampling operations of the sampling gates 4 and 4a are simultaneously performed by the use of sampling pulses applied from the sampling pulse generator 10. The sampled current levels, which are successively obtained by sampling the output of the attenuator 2 in response to the sampling pulses are successively held at the voltage hold circuit 5 so as to obtain a sampled-held current wave 22. The sampled voltage levels, which are successively obtained by sampling the output of the attenuator 2a in response to the sampling pulses, are successively held at the voltage hold circuit 5a so as to obtain a sampled-held voltage wave 21.

If an impedance characteristic of the sample S is to be obtained, division operation of the sampled-held voltage wave 21 by the sampled-held voltage wave 22 is performed in the calculator 12. If a power characteristic of the sample S is to be obtained, multiplication operation for the sampled-held current wave 21 and the sampled-held voltage wave 22 is performed in the calculator 12. A result of the division operation is shown by an impedance wave 23, while a result of the multiplication operation is shown by a power wave 24. The impedance wave 23 or the power wave 24 is applied to the Y-axis terminal of the display device 13, while the staircase wave 20 is applied to the X-axis terminal of the display device 13. The display device 13 indicates a measured pattern of the desired characteristic of the sample S. Inputs of the display device 13 may be utilized for further analysis through terminals 40 and 41.

As mentioned above, a transitional impedance characteristic and a transitional power impedance characteristic for a sample of semiconductor switching elements can be automatically measured and displayed in the time base as dynamic characteristics. If an average value of the power characteristic is required, the power wave 24 is integrated by an integrator which is provided in the calculator 12 and has a desired time constant.

Accordingly, the following characteristics of a semiconductor switching element can be readily measured in accordance with this invention:
  a. a dynamic characteristic at a turn-ON instant,
  b. a dynamic characteristic at a turn-OFF instant,
  c. fluctuation of the impedance under a steady current,
  d. fluctuation of the impedance caused by a surge current or voltage,
  e. flucturation of the impedance caused by fluctuation of the temperature.

The above mentioned measurement is performed in accordance with the principle similar to a sampling oscilloscope by repeated excitation. The dynamic impedance for a single excitation pulse can be measured in accordance with this invention as shown in FIG. 3.

Figures 3, 4:
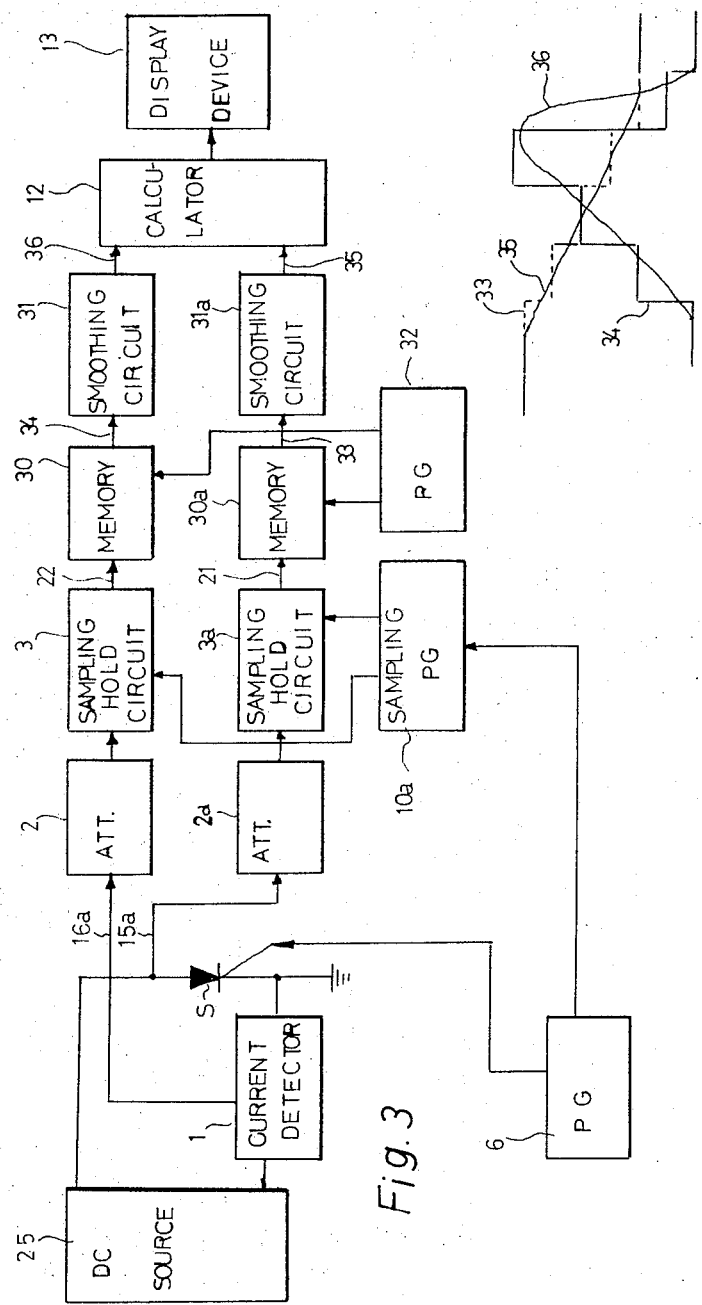
FIG. 3 is a block diagram illustrating another embodiment of this invention.
FIG. 4 shows wave forms explanatory of operations of the embodiment shown in FIG. 3.

In this embodiment shown in FIG. 3, circuits 1, 25, 2, 2a, 3, 3a, 12 and 13 are the same as those shown in FIG. 1. A sampling pulse generator 10a directly excited by the pulse generator 6, which generates a single pulse in response to start instructions by a control switch provided therewith. Accordingly, the sampling pulse generator 10a generates sampling pulses at regular intervals from a starting time in synchronism with the above mentioned start instructions. In other words, a transitional fluctuation in each of the current output 15a and the voltage output 16a from the sample S is sampled in a sufficient number of times in the sampling hold circuit 3 or 3a by the use of high speed sampling pulses from the sampling pulse generator 10a. A sampled-and-held output of the sampling hold circuit 3 is applied to storage means including a memory 30, which is a circulating memory, by way of example, controlled by clock pulses from a pulse generator 32. The clock pulses from the pulse generator 32 usually has a sufficiently long period in comparison with the period of the sampling pulses from the sampling pulse generator 10a for employing low speed circuitry as the calculator 12 and the display device 13. A sampled-and-held voltage output 21 of the sampling hold circuit 3a is applied to a memory 30a, which is also a circulating memory, by way of example, controlled by the same clock pulses from the pulse generator 32. A voltage output 33 from the memory 30a is applied to a smoothing circuit 31a for obtaining a rounded voltage signal 35, while a current output 34 from the memory 30 is applied to a smoothing circuit 31 for obtaining a rounded current signal 36 as shown in FIG. 4. The rounded current signal 36 and the rounded voltage signal 35 more closely resemble with the current output 16a and the voltage output 15a in comparison with the current output 34 and the voltage output 33 respectively. The rounded waveforms 35 and 36 are handled at the calculator and the display device in a manner similar to the above mentioned calculation and display operations.

In the above embodiments of this invention, the calculator 12 may perform a more complicated calulation in addition to the multiplication and division operations.

In view of functions of apparatus of this invention mentioned above, this invention can be further applied to measure the following characteristics:
  1. fluctuation characteristics of a semiconductor bulk as a function of time elapsed;
  2. domain forming process of a semiconductor bulk;
  3. response characteristics of a semiconductor sample against radial rays or laser lights; and
  4. an inductance characteristic of a superconducting wire as a function of flowed current increased or decreased.

What we claim is:

1. An apparatus for automatically measuring dynamic characteristics of a semiconductor switching element, comprising:
  a dc source for applying a dc bias voltage across electrodes of a semiconductor switching element, a pulse generator connected to the control electrode of the semiconductor switching element for applying at least one exciting pulse to said element to switch the element from the non-conductive state to the conductive state to develop a first output signal corresponding to the dynamic voltage characteristic of the semiconductor switching element, current detector means connected in series between said dc source and said semiconductor switching element for detecting the dynamic current flowing in the semiconductor switching element and for developing simultaneously with the development of said first output signal a second output signal corresponding to the dynamic current characteristic, a sampling pulse generator responsive to said exciting pulse for developing sampling pulses at regular intervals, a first sampling and holding circuit receptive of said second output signal of said current detector means and responsive to said sampling pulses for sampling values of said second output signal and for holding each sampled value until the occurrence of the immediately succeeding one of said sampling pulses to develop a sampled-and-held current signal, a second sampling and holding circuit receptive of said first output signal and responsive to said sampling pulses for sampling values of said first output signal and for holding each sampled value until the occurrence of the immediately succeeding one of said sampling pulses to develop a sampled-and-held voltage signal, calculating means simultaneously receptive of said sampled-and-held current and voltage signals for performing, at desired intervals, calculations therewith to derive therefrom at least one other dynamic parameter characteristic of the semiconductor switching element and for developing a third output signal corresponding thereto, and display means receptive of said third output signal for displaying the waveform of said third output signal to display said other dynamic parameter characteristic.

2. An apparatus according to claim 1, in which said pulse generator has means responsive to a start instruction for generating a single exciting pulse, and in which said sampling pulse generator has means responsive to said single exciting pulse for generating a plurality of sampling pulses.

3. An apparatus according to claim 1, in which said pulse generator has means for generating said exciting pulses at first regular intervals, and in which said sampling pulse generator has means for generating sampling pulses at second regular intervals which are slightly longer than said first regular intervals.

4. An apparatus according to claim 2, further comprising a second pulse generator for generating clock pulses, a first circulating memory circulating in synchronism with said clock pulses and receptive of successive values of said sampled-and-held current signal for storing same, a second circulating memory circulating in synchronism with said clock pulses and receptive of successive values of said sampled-and-held voltage signal for storing same, a first smoothing circuit receptive of the output of said first circulating memory for producing a rounded current signal, and a second smoothing circuit receptive of the output of said second circulating memory for producing a rounded voltage signal, and in which said calculating means has means receptive of said rounded current signal and said rounded voltage signal.

5. An apparatus according to claim 1, in which said calculating means has means responsive to said exciting pulses for synchronizing the calculations therewith.

6. A system for making dynamic electronic measurements on a semiconductor switching element under test, said system comprising: means for effecting the alternate instantaneous dynamic switching of a semiconductor switching element under test into a nonconductive state and a conductive state and for simultaneously developing in response to the instantaneous dynamic switching two electrical output pulse signals corresponding respectively to the dynamic current and dynamic voltage characteristics of the semiconductor switching element under test; and means receptive of said two electrical output pulse signals for deriving therefrom at least one output test signal corresponding to one other dynamic parameter characteristic of the semiconductor switching element under test, said means for deriving at least one output test signal comprises two sampling means each receptive of one of said two electrical output pulse signals for sampling the magnitude thereof and for developing sampler output signals which are proportional to the respective one of said two electrical output pulse signals received and which have waveforms substantially similar thereto, calculating means receptive of the sampler output signals of both sampling means for performing mathematical operations thereon to derive therefrom at least one other dynamic parameter characteristic, and two storage means each connected in series between one of said sampling means and said calculating means for storing the values of the sampler output signals and for supplying the stored values to said calculating means.

* * * * *